(12) United States Patent
Bianchini et al.

(10) Patent No.: US 12,224,440 B2
(45) Date of Patent: Feb. 11, 2025

(54) PROCESS FOR MAKING A COATED CATHODE ACTIVE MATERIAL, AND COATED CATHODE ACTIVE MATERIAL

(71) Applicants: BASF SE, Ludwigshafen am Rhein (DE); Karlsruher Institut Für Technologie, Karlsruhe (DE)

(72) Inventors: Matteo Bianchini, Bayreuth (DE); Pascal Hartmann, Ludwigshafen (DE); Torsten Brezesinski, Eggenstein-Leopoldshafen (DE); Katja Ramona Kretschmer, Karlsruhe (DE); Soeren Lukas Dreyer, Karlsruhe (DE)

(73) Assignees: BASF SE, Ludwigshafen Am Rhein (DE); KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 0 days.

(21) Appl. No.: 18/564,734

(22) PCT Filed: Jun. 14, 2022

(86) PCT No.: PCT/EP2022/066240
§ 371 (c)(1),
(2) Date: Nov. 28, 2023

(87) PCT Pub. No.: WO2023/274723
PCT Pub. Date: Jan. 5, 2023

(65) Prior Publication Data
US 2024/0282961 A1    Aug. 22, 2024

(30) Foreign Application Priority Data

Jun. 28, 2021 (EP) .................................. 21181932

(51) Int. Cl.
*H01M 4/58* (2010.01)
*H01M 4/131* (2010.01)
*H01M 4/36* (2006.01)
*H01M 4/505* (2010.01)
H01M 4/02 (2006.01)

(52) U.S. Cl.
CPC .......... *H01M 4/5825* (2013.01); *C01G 53/50* (2013.01); *H01M 4/131* (2013.01); *H01M 4/366* (2013.01); *H01M 4/505* (2013.01); C01P 2002/52 (2013.01); C01P 2004/80 (2013.01); C01P 2006/40 (2013.01); H01M 2004/028 (2013.01)

(58) Field of Classification Search
CPC ...... H01M 4/131; H01M 4/366; H01M 4/485; H01M 4/525
See application file for complete search history.

(56) References Cited

U.S. PATENT DOCUMENTS

| | | | |
|---|---|---|---|
| 8,993,051 B2 | 3/2015 | Kelder et al. | |
| 2015/0372300 A1 | 12/2015 | Imaizumi et al. | |
| 2016/0240842 A1* | 8/2016 | Fang | C01G 53/42 |
| 2018/0233740 A1* | 8/2018 | You | H01M 4/131 |

FOREIGN PATENT DOCUMENTS

| | | | | |
|---|---|---|---|---|
| CN | 105428637 A | 3/2016 | | |
| CN | 107681138 A | 2/2018 | | |
| CN | 108878799 A | 11/2018 | | |
| CN | 109411733 A | * 3/2019 | ............. | B82Y 30/00 |
| CN | 109904424 A | * 6/2019 | ........ | H01M 10/0525 |
| CN | 112447951 A | * 3/2021 | ........ | H01M 10/0525 |
| CN | 112673495 A | 4/2021 | | |
| JP | 4789066 B2 | 7/2011 | | |
| JP | 5139024 B2 | 11/2012 | | |
| WO | 2020/099302 A2 | 5/2020 | | |

OTHER PUBLICATIONS

Su et al., "Advances and Prospects of Surface Modification on Nickel-Rich Materials for Lithium-Ion Batteries", Chin. J. Chem, vol. 38, pp. 1817-1831 (2020).
Wang et al., "Enhanced electrochemical performance of Lithium Metasilicate-coated LiNi0.6Co0.2Mn0.2O2 Ni-rich cahthode for Li-ion batteries at high cutoff voltage", Electrochimica Acta, vol. 222, pp. 806-813 (2016).
Zhao et al., "Improved cycle stability of high-capacity Ni-rich LiNi0.8Mn0.1Co0.1O2 at high cut-off voltage by Li2SiO3 coating", Journal of Power Sources, vol. 343, pp. 345-353 (2017).
International Search Report and Written Opinion for corresponding PCT/EP22/66240 mailed Sep. 27, 2022, 11 pages.

* cited by examiner

Primary Examiner — Khanh T Nguyen
(74) Attorney, Agent, or Firm — Armstrong Teasdale LLP

(57) ABSTRACT

Disclosed herein is a process for making a coated cathode active material, where the process includes the following steps:
(a) providing an electrode active material according to general formula $Li_{1+x}TM_{1-x}O_2$, where TM is a combination of metals according to general formula (I), and x is in the range of from zero to 0.2, with a moisture content in the range of from 500 to 1,500 ppm, $$(Ni_aCo_bMn_c)_{1-d}M_d \quad \text{(I)}$$

(b) reacting the electrode active material with a silicon alkoxide and an alkyl aluminum compound in one or more sub-steps, and
(c) heat-treating the material so obtained in an oxygen-containing atmosphere at a temperature in the range of from 100 to 400° C. for 10 minutes to 4 hours.

10 Claims, No Drawings

PROCESS FOR MAKING A COATED CATHODE ACTIVE MATERIAL, AND COATED CATHODE ACTIVE MATERIAL

CROSS-REFERENCE TO RELATED APPLICATIONS

This application is a U.S. National Phase Application of International Patent Application No. PCT/EP22/66240, filed Jun. 14, 2022, which claims priority to European Patent Application No. 21181932.1, filed Jun. 28, 2021, each of which is hereby incorporated by reference herein.

The present invention is directed towards a process for making a coated electrode active material wherein said process comprises the following steps:

(a) providing an electrode active material according to general formula $Li_{1+x}TM_{1-x}O_2$, wherein TM is Ni or a combination of metals according to formula (I), and x is in the range of from zero to 0.2, with a moisture content in the range of from 500 to 1,500 ppm,

(I)

with
a being in the range of from 0.3 to 0.4,
b being in the range of from zero to 0.1,
c being in the range of from 0.6 to 0.7, and
d being in the range of from zero to 0.1,
M is Al or Ti or Zr or Mg, and $$a + b + c = 1,$$

(b) reacting said electrode active material with a silicon alkoxide and an alkyl aluminum compound in one or more sub-steps,
(c) heat-treating the material so obtained in an oxygen-containing atmosphere at a temperature in the range of from 100 to 400° C. for 10 minutes to 4 hours.

In addition, the present invention is directed towards Ni-rich electrode active materials.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories link undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

It was an objective of the present invention to provide a process for making electrode active materials with excellent electrochemical properties. It was also an objective to provide and especially so-called Ni-rich electrode active materials with excellent electrochemical properties.

Accordingly, the process defined at the outset has been found, hereinafter also referred to as "inventive process". The inventive process comprises at least three steps, step (a), step (b) and step (c). Said steps are described in more detail below.

Step (a) includes providing an electrode active material according to general formula $Li_{1+x}TM_{1-x}O_2$, wherein TM is Ni or a combination of metals according to formula (I),

(I)

with
a being in the range of from 0.3 to 0.4,
b being in the range of from zero to 0.1,
c being in the range of from 0.6 to 0.7, and
d being in the range of from zero to 0.1,
M is Al or Ti or Zr or Mg, and $$a + b + c = 1,$$

for example Ni and Mn, preferably Ni and a combination of Co and Mn, and, optionally, at least one metal selected from Mg, Ti and Zr, and x is in the range of from zero to 0.2, preferably 0.01 to 0.05, with a moisture content in the range of from 500 to 1,500 ppm, preferably 1,000 to 1,200 ppm. At least 60 mol-% of TM is manganese.

The moisture content may be determined by Karl-Fischer titration.

In one embodiment of the present invention the particulate material has an average particle diameter (D50) in the range of from 3 to 20 μm, preferably from 5 to 16 μm. The average particle diameter can be determined, e. g., by light scattering or LASER diffraction. The particles are usually composed of agglomerates from primary particles, and the above particle diameter refers to the secondary particle diameter.

In one embodiment of the present invention, the particulate material has a specific surface, hereinafter also "BET surface" in the range of from 0.1 to 1.5 m²/g. The BET surface may be determined by nitrogen adsorption after outgassing of the sample at 200° C. for 30 minutes or more and beyond this accordance with DIN ISO 9277:2010.

The variable x for $Li_{1+x}TM_{1-x}O_2$ and TM corresponding to formula (I) is preferably in the range of from 0.05 to 0.2, more preferably from 0.1 to 0.15.

The electrode active material provided in step (a) is usually free from conductive carbon, that means that the conductive carbon content of starting material is less than 1% by weight, referring to said starting material, preferably 0.001 to 1.0% by weight and even more below detection level.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material. Traces of sulfate are neglected as well.

The electrode active material provided in step (a) has a moisture content in the range of from 500 to 1,500 ppm, preferably 1,000 to 1,200 ppm, ppm being parts per million (weight). Such moisture may be introduced by treating the electrode material with a water-containing solvent. Preferably, said solvent has a boiling point below 100° C. Examples are water-containing $C_1$-$C_3$-alkanol, for example isopropanol, ethanol, n-propanol, especially methanol.

In one embodiment of the present invention, said water-containing solvent has a water content in the range of from 0.05 to 5 vol-%, preferably 0.1 to 0.5 vol-%.

In one embodiment of the present invention, the volume ratio of water-containing solvent to electrode active material provided in step (a) is in the range of from 1:1 to 10:1. Higher amounts of solvent provide for more effort to remove the solvent. Too low an amount of solvent may lead to an unbalanced treatment with moisture, leaving some electrode active material provided in step (a) moisture free and the other electrode active material provided in step (a) treated with moisture.

The solvent is removed after the treatment, for example by filtration or evaporation. In the course of evaporation, it is advantageous to avoid harsh conditions such as drying at 120° C. It is preferred to evaporate at a reduced pressure, for example 1 to 200 mbar (abs).

In other embodiments, the moisture content may be achieved by storage in a moist atmosphere.

In step (b), said electrode active material is reacted with a silicon alkoxide and an alkyl aluminum compound in one or more sub-steps, preferably in one step.

Examples of silicon alkoxides are $C_1$-$C_4$-alkoxides of silicon, for example $Si(OCH_3)_4$, $Si(OC_2H_5)_4$, $Si(O-n-C_3H_7)_4$, $Si(O-iso-C_3H_7)_4$, $Si(O-n-C_4H_9)_4$, and combinations of at least two of the foregoing, with $Si(OCH_3)_4$ and $Si(OC_2H_5)_4$ being preferred. Intermediates formed by partial hydrolysis of any of the aforementioned $C_1$-$C_4$-alkoxides of silicon may react with the electrode active material as well, for example disilicon compounds such as, but not limited to $(CH_3O)_3Si-O-Si(OCH_3)_3$ and $(C_2H_5O)_3Si-O-Si(OC_2H_5)_3$.

Examples of alkyl aluminum compounds are tri-$C_1$-$C_4$-alkyl compounds of Al, for example methyldiisopropylaluminum, tri-isopropylaluminum, dtri-n-butylaluminum, ethyldimethyl aluminum, trimethylaluminum and triethylaluminum, and in particular trimethylaluminum. Methylalumoxane that may be formed as an intermediate is a possible reaction partner as well.

In one embodiment of the present invention, the molar ratio of silicon to aluminum in silicon alkoxide and trialkyl aluminum compound in step (b) is in the range of from 1:10 to 10:1, preferably 1:3 to 3:1. This ratio corresponds to the ratio of silicon alkoxide to trialkyl aluminum compound employed in step (b). It is observed that the trialkyl aluminum compound is in many cases more reactive than the silicon alkoxide, and unreacted silicon alkoxide may be removed after the apparent completion of the reaction in step (b).

In one embodiment of the present invention, the amount of silicon alkoxide and alkyl aluminum compound is in the range of 1 to 30 g/kg electrode active material provided in step (a) each.

In a preferred embodiment of the present invention, the duration of step (b) is in the range of from 1 second to 2 hours, preferably 1 second up to 10 minutes.

In one embodiment of the present invention, step (b) is performed at a temperature in the range of from 5° C. to 85° C., preferably 15 to 40° C.

In one embodiment of the present invention, step (b) is performed without solvents, and silicon alkoxide and trialkyl aluminum are evaporated and then the electrode material provided in step (a) is exposed to the evaporated silicon alkoxide and trialkyl aluminum.

In a preferred embodiment of the present invention, step (b) is performed in the presence of at least one organic solvent. Due to the nature of the reactants, such organic solvent should be aprotic and halogen-free. Preferably, hydrocarbons are selected as solvent, for example, alkanes, cycloalkanes or aromatic hydrocarbons, n-hexane, n-heptane, n-octane, iso-octane, cyclohexane, cycloheptane, and in particular aromatic hydrocarbons such as toluene, ethyl benzene, ortho-xylene, meta-xylene, and isomer mixtures of at least two of the three xylenes.

In one embodiment of the present invention, the ratio of solvent to electrode active material provided in step (a) is in the range of from 0.1 to 4 ml/g.

Step (b) may be performed in one step or in two or more sub-steps, one step being preferred. Sub-steps may include a first sub-step of treatment with silicon alkoxide and second sub-step of treatment with trialkyl aluminum. In another embodiment, a first sub-step of treatment with trialkyl aluminum is performed and second sub-step of treatment with silicon alkoxide. It is preferred, though, to perform a simultaneous treatment with silicon alkoxide and trimethyl aluminum compound.

Especially when performed in the presence of a solvent, the pressure at which step (b) is performed is not critical. For practical purposes, ambient pressure is preferred.

After step (b), the solvent—if present—as well as by-products such as alcohols and alkanes are removed, preferably by evaporation. The conditions under which such solvent is evaporated depends on its volatility. The temperature may be in the range of from 50 to 150° C., and the pressure may be in the range of from 1 mbar to 500 mbar.

A material is obtained that will subsequently be subjected to step (c).

In step (c) of the inventive process, the material so obtained is heat-treated in an oxygen-containing atmosphere at a temperature in the range of from 100 to 400° C. for 10 minutes to 4 hours.

Step (c) may be carried out in any type of oven, for example, a roller hearth kiln, a pusher kiln, a rotary kiln, a pendulum kiln, or—for lab scale trials—in a muffle oven.

The temperature of the thermal treatment according to step (c) may be in the range of from 100 to 400° C., preferably 250 to 350° C. Said temperature refers to the maximum temperature of step (c).

In one embodiment of the present invention, the temperature is ramped up before reaching the desired temperature of from 100 to 400° C. For example, first the material resulting from step (b) is heated to a temperature to 75 to 90° C. and then held constant for a time of 10 min to 0.5 hours, and then it is raised to 100 to 400° C.

In one embodiment of the present invention, the heating rate in step (c) is in the range of from 0.1 to 10° C./min.

In one embodiment of the present invention, step (c) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (c) is performed in an oxygen-containing atmosphere, for example, in a nitrogen-air mixture, in a rare gas-oxygen mixture, in air, in oxygen or in oxygen-enriched air or in pure oxygen. In a preferred embodiment, the atmosphere in step (c) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen. Pure oxygen is even more preferred.

In one embodiment of the present invention, step (c) has a duration in the range of from 10 minutes to 4 hours. Preferred are 60 minutes to 3 hours. The cooling time is neglected in this context.

By carrying out the inventive process, coated electrode active materials are obtained with excellent electrochemical properties. Without wishing to be bound by any theory, we assume that the decomposition products of alkoxy compound of silicon and of trialkyl aluminum compound form a layer of compounds capable of HF scavenging, deposited at the surface of the electrode active material. Coated electrode active materials as obtained in the context with the present invention refer to at least 80% of the particles of a batch of particulate cathode active material being coated, and to at least 75% of the surface of each particle being coated, for example 75 to 99.99% and preferably 80 to 90%.

They show excellent electrochemical properties.

In a special embodiment of the present invention, in step (b) or in a sub-step before or after step (b) a carbonyl compound or an organometallic compound of cobalt is applied to the electrode active material provided in step (a) or resulting from step (b). The term "carbonyl compounds of cobalt" refers to compounds that are CO complexes of cobalt, with or without additional ligands. Examples of such carbonyl compounds of cobalt are $Co_2(CO)_8$, $Co(CO)_3NO$, $Co(CO)_3CF_3$, $[Co(CO)_3](Co.C_1\text{-}C_4\text{-alkyl})_2$, and $HCo(CO)_3$. Examples of organometallic compounds of cobalt are $[(\eta^5\text{-}Cp)_2Co]$ with Cp being cyclopentadienyl, $\eta^5\text{-}CpCo(CO)_2$, $[Co(\eta^3\text{-allyl})(CO)^3]$, and $\eta^5$-CpCo-bisamidinates. Some compounds such as $\eta^5\text{-}CpCo(CO)_2$ may qualify both as carbonyl compound and as organometallic compound of cobalt.

Depending on the type of ligands, cobalt may be deposited as Co(0) or with an oxidation state higher than zero.

In one embodiment of the present invention, 1 to 5 weight-% of Co are deposited, referring to the electrode active material provided in step (a) or resulting from step (b), as the case may be.

A further aspect of the present invention is related to coated particulate materials, hereinafter also referred to as inventive cathode active materials or inventive particulate materials or inventive coated particulate materials.

Inventive coated particulate materials in the context with the present invention refer to at least 80% of the particles of a batch of particulate material being coated, and to at least 75% of the surface of each particle being coated, for example 75 to 99.99% and preferably 80 to 90%.

The thickness of such coating may be very low, for example 0.1 to 5 nm. In other embodiments, the thickness may be in the range of from 6 to 15 nm. In further embodiments, the thickness of such coating is in the range of from 16 to 50 nm. The thickness in this context refers to an average thickness determined mathematically by calculating the amount of metal alkoxide and alkyl metal compound per particle surface in m² and assuming a 100% conversion in steps (b).

Without wishing to be bound by any theory, it is believed that non-coated parts of particles do not react due to specific chemical properties of the particles, for example density of chemically reactive groups such as, but not limited to hydroxyl groups, oxide moieties with chemical constraint, or to adsorbed water.

In one embodiment of the present invention the inventive coated particulate material has an average particle diameter (D50) in the range of from 3 to 20 μm, preferably from 5 to 16 μm. The average particle diameter can be determined, e.g., by light scattering or LASER diffraction. The particles are usually composed of agglomerates from primary particles, and the above particle diameter refers to the secondary particle diameter.

In one embodiment of the present invention, the inventive coated particulate material has a specific surface, hereinafter also "BET surface" in the range of from 0.1 to 1.5 m²/g. The BET surface may be determined by nitrogen adsorption after outgassing of the sample at 200° C. for 30 minutes or more and beyond this accordance with DIN ISO 9277:2010.

Inventive particulate cathode active material comprise a core material according to general formula $Li_{1+x}TM_{1-x}O_2$, wherein TM is a combination of metals according to formula (I), and x is in the range of from zero to 0.2, preferably 0.05 to 0.2, more preferably from 0.1 to 0.15, wherein the outer surface of the core material is non-homogeneously coated with a mixed oxide of aluminum and silicon of uniform composition.

The term "uniform composition" shall indicate that rather than arranged in various layers, the coating appears without changes in composition over the entire respective particle, for example when viewed with EDX (Energy Dispersive X-ray spectroscopy) mapping. The "uniform composition" shall include mixtures of two or multiple compounds with a uniform ratio.

In one embodiment of the present invention, said coating comprises a compound selected from $Li_4SiO_4$, $Li_2SiO_3$, and $Li_2Si_3O_7$, and a compound selected from $LiAlSiO_4$ and $LiAlSi_2O_6$.

In one embodiment of the present invention, said coating comprises a combination of at least two compounds selected from $Al_2O_3$, $SiO_2$, $Li_4SiO_4$, $Li_2SiO_3$, $Li_2Si_3O_7$, $LiAlSiO_4$ and $LiAlSi_2O_6$ and of which at least one contains lithium. In such combinations, at least one compound contains Al and at least one contains Si.

TM is a combination of metals according to general formula (I)

$$(Ni_aCo_bMn_c)_{1-d}M_d \quad \text{(I)}$$

with
a being in the range of from 0.3 to 0.4,
b being in the range of from zero to 0.1,
c being in the range of from 0.6 to 0.7, and
d being in the range of from zero to 0.1,
M is Al or Ti or Zr or Mg, and $$a + b + c = 1.$$

In one embodiment of the present invention, the molar ratio of silicon to aluminum in the coating is in the range of from 1:20 to 1:1; preferably 1:20 to 1:5.

Inventive cathode active materials may be obtained by the inventive process. Without wishing to be bound by any theory, it is assumed that due to the different reactivities of silicon alkoxides and alkyl aluminum compounds towards moisture-containing electrode active material as provided in step (a), a higher share of trialkyl aluminum is deposited and a higher share of unreacted silicon alkoxide is lost and removed.

Inventive cathode active materials display excellent properties especially with respect to cycling stability and low capacity fade.

A further aspect of the present invention refers to electrodes comprising at least one electrode active material according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Specifically, inventive cathodes contain
(A) at least one inventive electrode active material,
(B) carbon in electrically conductive form,
(C) a binder polymer, also referred to as binder or binder (C) or (C), and, preferably,
(D) a current collector.

In a preferred embodiment, inventive cathodes contain
(A) 80 to 98% by weight inventive electrode active material,
(B) 1 to 17% by weight of carbon,
(C) 1 to 15% by weight of binder polymer,
percentages referring to the sum of (A), (B) and (C).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (B). Carbon (B) can be selected from soot, active carbon, carbon nanotubes, graphene, and graphite, and from combinations of at least two of the foregoing.

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol-% of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be selected from cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoridehexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

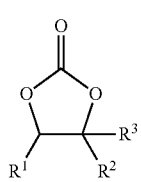

(II)

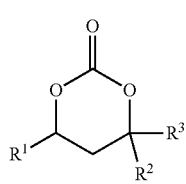

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

The solvent or solvents is/are preferably used in the water-free state, i.e. with a water content in the range from 1 ppm to 0.1% by weight, which can be determined, for example, by Karl-Fischer titration.

Electrolyte further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LIN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In one embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircrafts or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

Average particle diameters (D50) were determined by dynamic light scattering ("DLS"). Percentages are % by weight unless specifically noted otherwise.

LiOH·OH was purchased from Rockwood Lithium.

The manufacture of base electrode active materials was performed in a box furnace, type:

VMK-80-S, Linn High Term.

Methanol and toluene were pre-dried according to standard laboratory methods.

Unless otherwise stated, all synthesis steps were performed in a glovebox (MB200B, MBraun) under argon atmosphere with oxygen and water concentrations below 0.1 ppm.

$Al(CH_3)_3$ was used as 2 M solution in toluene, commercially available from Sigma-Aldrich. $Si(OC_2H_5)_4$ ("Si(OEt)$_4$") was used in bulk, commercially available from Merck KGaA.

I. Manufacture of Base Electrode Active Materials

I.1 Manufacture of a Precursor, P-CAM.1

Precipitation of nickel hydroxide was performed at 55° C. under a nitrogen atmosphere using a continuously stirred tank reactor with a volume of 2.3 l. Aqueous solutions of nickel sulfate, ammonia and sodium hydroxide were fed into the reactor. The individual flow rates were adjusted to ensure a pH value of 12.6 (plus/minus 0.2), a molar ratio of nickel to ammonia of 0.8 and a residence time of around 8 hours. The obtained solid was removed by filtration, washed with de-ionized water for 12 hours and dried at 120° C. for 16 hours. The resultant $Ni(OH)_2$ ("P-CAM.1") had an average particle diameter D50 of 10 μm.

I.2 Manufacture of Base Electrode Active Material B-CAM.1 ($LiNiO_2$)

P-CAM.1 (12.981 g, 0.140 mol, 1.00 eq.) and LiOH·H$_2$O (5.933 g, 0.141 mol, 1.01 eq.) were thoroughly mixed and the resulting mixture was calcined under oxygen flow (5.00 L–h$^{-1}$, equal to about 0.65 reactor volume exchanges per h) at 700° C. for 6 h, employing heating and cooling rates of 3° C. min$^{-1}$. The calcination product was transferred into a glovebox and sieved with a 45 μm metal sieve, yielding 13.272 g of B-CAM.1. Karl-Fischer titration showed the moisture content to be below detection level of 50 ppm.

I.3 Manufacture of a Precursor, P-CAM.2, $TM=Ni_{0.85}Co_{0.10}Mn_{0.5}$

The precipitation reaction was performed at 55° C. under a nitrogen atmosphere using a continuous stirred tank reactor with a volume of 2.3 l. The continuous stirred tank reactor was charged with 1.5 l of the above aqueous solution of $(NH_4)_2SO_4$. Then, the pH value of the solution was adjusted to 11.5 using a 25% by weight aqueous solution of sodium hydroxide. An aqueous metal solution containing $NiSO_4$, $CoSO_4$ and $MnSO_4$ (molar ratio 85:10:5, total metal concentration: 1.65 mol/kg), aqueous sodium hydroxide (25 weight-% NaOH) and aqueous ammonia solution (25 weight-% ammonia) were simultaneously introduced into the vessel. The molar ratio between ammonia and metal was adjusted to 0.265. The sum of volume flows was set to adjust the mean residence time to 5 hours. The flow rate of the NaOH was adjusted by a pH regulation circuit to keep the pH value in the vessel at a constant value of 11.58. The apparatus was operated continuously keeping the liquid level in the vessel constant. A mixed hydroxide of Ni, Co and Mn was collected via free overflow from the vessel. The resulting product slurry contained about 120 g/l mixed hydroxide of Ni, Co and Mn with an average particle size (D50) of 10.5 μm, P-CAM.2. P-CAM.2 was removed by filtration, washed with deionized water for 12 hours and dried at 120° C. for 16 hours.

I.4 Manufacture of B-CAM.2

Subsequently, P-CAM.2 was mixed with LiOH. H$_2$O at a molar ratio of Li:TM of 1.02:1 and calcined at 780° C. with a dwell time of 10 hours in a flow of pure oxygen. The heating rate was 3° C./min. Particulate B-CAM.2 was obtained and sieved using a mash size of 32 μm. Karl-Fischer titration showed the moisture content to be below detection level, 50 ppm.

I.5 Manufacture of Moisture-Containing Electrode Active Materials

I.5.1 Manufacture of Moisture-Containing B-CAM.1, Step (a.1)

An amount of 3.5 g of B-CAM.1 was slurried in a solution of 15 μl of de-ionized water in 5 ml pre-dried methanol and shaken over a period of time of 5 minutes. The supernatant liquid phase was removed with a syringe, then the moisture-containing B-CAM.1 was dried at ambient temperature and $1·10^{-3}$ mbar pressure on a Schlenk line for 2 h. Wetting was confirmed by Karl Fischer titration, indicating a water content of 1,150 ppm.

I.5.2 Manufacture of Moisture-Containing B-CAM.2, Step (a.2)

An amount of 3.5 g of B-CAM.2 was slurried in a solution of 15 μl of de-ionized water in 5 ml pre-dried methanol and shaken over a period of time of 5 minutes. The supernatant liquid phase was removed with a syringe, then the moisture-containing B-CAM.2 was dried at ambient temperature and $1·10^{-3}$ mbar pressure on a Schlenk line for 2 h. Wetting was confirmed by Karl Fischer titration, indicating a water content of 1,150 ppm.

II. Synthesis of Inventive Cathode Active Materials

II.1 Synthesis of Inventive Cathode Active Materials Based on B-CAM.1

General Procedure

Step (b.1): An oven-dried Schlenk flask containing a magnetic stirring bar was charged with 7 mL of pre-dried toluene. Then, a combination of $Al(CH_3)_3$ and $Si(OC_2H_5)_4$ in toluene was added in accordance with Table 1. Then, 2.5 g of moisture-containing B-CAM.1 were added. The resultant slurry was allowed to react for 2 hours at ambient temperature under stirring, then the Schlenk flask was transferred to a Schlenk line with a cold trap between line and flask, into which solvent and excess reagents were removed in vacuo. When no liquid phase was visible any more, the flask was directly attached to the Schlenk line and the resultant material dried at ambient temperature and $1·10^{-3}$ mbar pressure over a period of 15 hours.

Step (c.1): The material obtained from step (b.1) was annealed at 300° C. in a tube furnace (P330, Nabertherm) under oxygen stream (1.00 l·h$^{-1}$ equal to 1.5 reactor volume exchanges per h) for 1 h. The heating and cooling rates were 2.3° C. per min. CAM.1.1 was obtained.

Step (b.2) is almost identical to step (b.1) but moisture containing B-CAM.2 was used as starting material instead of moisture-containing B-CAM.1. CAM.2.1 was obtained.

TABLE 1

Details about step (b.1) and (b.2)

| | B-CAM | Al(CH$_3$)$_3$ per g of B-CAM, [μmol] | Si(OEt)$_4$ per g of B-CAM, [μmol] |
|---|---|---|---|
| CAM.1.1 | B-CAM.1 | 150 | 150 |
| CAM.2.1 | B-CAM.2 | 150 | 150 |

TABLE 2

Analytic data of inventive cathode active materials and of the respective base materials

| Material | Coating layer thickness from TEM-EDX [nm] | Al content from ICP-OES [weight-%] | Si content from ICP-OES [weight-%] |
|---|---|---|---|
| B-CAM.1 | — | 0.0029 | 0.0075 |
| CAM.1.1 | 5 to 20 | 0.0709 | 0.0195 |
| B-CAM.2 | — | 0.0013 | n.d. |
| CAM.2.1 | 10 to 30 | 0.0802 | 0.0149 | n.d.: not determined

III. Cathode and Coin Cell Manufacture

III.1 Cathode Manufacture/General Procedure:

The cathode slurries necessary for cathode preparation were prepared by first mixing a 7.5 wt % binder solution of polyvinylidene difluoride (PVDF, Solef 5130, Solvay) in N-methyl-2-pyrrolidone (NMP, ≥99.5%, Merck KGaA) with conductive carbon black (Super C65, TIMCAL Ltd.) and NMP in a planetary centrifugal mixer (ARE-250, Thinky) for 3 min at 2000 rpm followed by 3 min at 400 rpm. After the first mixing, the respective CAM was added to the slurry. For cathode active materials based on B-CAM.1, a sealable screw-cap mixing cup was used and the respective cathode active material was added inside the glovebox. For cathode active materials based on B-CAM.2, an open mixing cup was used. The mixture was then stirred again for 3 min at 2000 rpm and 3 min at 400 rpm, yielding a homogenous deep black slurry. Using a motorized film applicator (Erichsen Coatmaster 510), the slurry was then immediately coated on 0.03 mm thick aluminum foil using a blade film applicator with a slit height of either 120 μm for CAM.2.1 or B-CAM.2, or 140 μm for CAM.1.1, or C-CAM.1 to obtain areal loadings of ~10 mg·cm$^{-2}$. The obtained tapes were dried at 120° C. in vacuo for 12 hours and afterwards calendared between two steel rolls under 15 N·mm$^{-1}$ line pressure in a laboratory calendar (Sumet Messtechnik).

III.2 Pouch Cell Manufacture

Single-layer pouch cells were assembled in a dry room (dew point <−55° C.), using a 50·30 mm$^2$ microporous polypropylene separator (Celgard 2500), 500 μL of electrolyte, consisting of 1.0 M LiPF$_6$ in 3:7 EC:DEC by weight with 2% vinylene carbonate additive, and a 42·22 mm$^2$ graphite anode.

Test Protocol:

In general, for every experiment, at least three cells were successfully cycled and results are shown as the average of these cells. They were cycled with a battery testing system (Series 4000, MACCOR) at 25° ° C. (material based on B-CAM.1) or 45° C. (material based on B-CAM.2). The first two cycles involved galvanostatic charging to 4.2 V at a rate of 0.1 C, with 1 C=195 mA·g$^{-1}$ for B-CAM.2 and CAM.2.1 and 225 mA·g$^{-1}$ for B-CAM.1 and CAM.1.1. After reaching the voltage limit, the charge was continued for either 1 h or until the current dropped below 0.02 C, depending on which condition was met first. After 5 min of rest, the cell was discharged to 2.8 V at 0.1 C rate and then rested for 5 min. After these initial cycles, the charge rate was set to 0.5 C. The discharge rate was 1 C for the 10 cycles, then a rate test with two cycles each at 0.50, 1C, 2 C and 3 C followed. For long-term cycling, the rate test was repeated after 100 cycles at 1 C each.

TABLE 3

Electrochemistry test results

| CAM | 1$^{st}$ cycle DC | 3$^{rd}$ cyc. DC | 3$^{rd}$ cycle mean discharge voltage [V] | 100$^{th}$ cyc. DC | CR 3$^{rd}$-100$^{th}$ cycle | 1000$^{th}$ cycle DC | CR 3$^{rd}$ to 1000$^{th}$ cycle | 1000$^{th}$ cycle mean discharge voltage [V] |
|---|---|---|---|---|---|---|---|---|
| B-CAM.1 | 219.7 | 204.0 | 3.67 | 154.5 | 75.7 | 70.0 | 34.3 | 3.11 |
| CAM.1.1 | 214.5 | 194.8 | 3.63 | 165.8 | 85.1 | 121.2 | 62.2 | 3.45 |
| B-CAM.2 | 191.7 | 185.4 | 3.69 | 171.5 | 92.5 | 128.5 | 69.3 | 3.44 |
| CAM.2.1 | 194.5 | 184.7 | 3.68 | 174.3 | 94.4 | 139.1 | 75.3 | 3.60 |

DC: discharge capacity, mAh/g$_{CAM}$

CR: Capacity retention in %

The invention claimed is:

1. A process for making a coated cathode active material, wherein said process comprises the following steps:
   (a) providing an electrode active material according to general formula $Li_{1+x}TM_{1-x}O_2$, wherein TM is a combination of metals according to formula (I), and x is in a range of from zero to 0.2, with a moisture content in a range of from 500 to 1,500 ppm, $$(Ni_aCo_bMn_c)_{1-d}M_d \quad (I)$$

with
   a being in a range of from 0.3 to 0.4,
   b being in a range of from zero to 0.1,
   c being in a range of from 0.6 to 0.7, and
   d being in a range of from zero to 0.1,
   M is Al or Ti or Zr or Mg, and $$a+b+c=1,$$

(b) reacting said electrode active material with a silicon alkoxide and an alkyl aluminum compound in one or more sub-steps, and
   (c) heat-treating the material obtained in step (b) in an oxygen-containing atmosphere at a temperature in a range of from 100 to 400° C. for 10 minutes to 4 hours.

2. A process according to claim 1, wherein the silicon alkoxide is selected from the group consisting of tetramethoxysilane and tetraethoxysilane.

3. A process according to claim 1 or 2, wherein the alkyl aluminum compound in step (b) is selected from the group consisting of trimethylaluminum and triethylaluminum.

4. A process according to claim 1, wherein a molar ratio of silicon to aluminum in step (b) is in a range of from 1:10 to 10:1.

5. A process according to claim 1, wherein step (b) is performed in a presence of at least one organic solvent.

6. A process according to claim 1, wherein in step (b) or in a sub-step before or after step (b) a carbonyl compound or an organometallic compound of cobalt is applied to the electrode active material provided in step (a) or resulting from step (b).

7. A particulate cathode active material comprising a core material according to general formula $Li_{1+x}TM_{1-x}O_2$, wherein TM is a combination of metals according to formula (I), and x is in a range of from zero to 0.2, and wherein an outer surface of the core material is non-homogeneously coated with a mixed oxide of aluminum and silicon of uniform composition, $$(Ni_aCo_bMn_c)_{1-d}M_d \quad (I)$$

with
a being in a range of from 0.3 to 0.4,
b being in a range of from zero to 0.1,
c being in a range of from 0.6 to 0.7, and
d being in a range of from zero to 0.1,
M is Al or Ti or Zr or Mg, and $$a+b+c=1.$$

8. The particulate material according to claim 7, wherein said coating comprises a compound selected from the group consisting of $LiAlSiO_4$ and $LiAlSi_2O_6$ and a compound selected from the group consisting of $Li_4SiO_4$, $Li_2SiO_3$, and $Li_2Si_3O_7$.

9. The particulate material according to claim 7, wherein a molar ratio of silicon to aluminum is in a range of from 1:20 to 1:1.

10. A cathode comprising:
   (A) at least one particulate material according to claim 7,
   (B) carbon in electrically conductive form, and
   (C) a binder polymer.

* * * * *